May 9, 1944. J. A. ANTONELLI 2,348,587
SEAL CONSTRUCTION
Filed Oct. 15, 1942 2 Sheets-Sheet 2
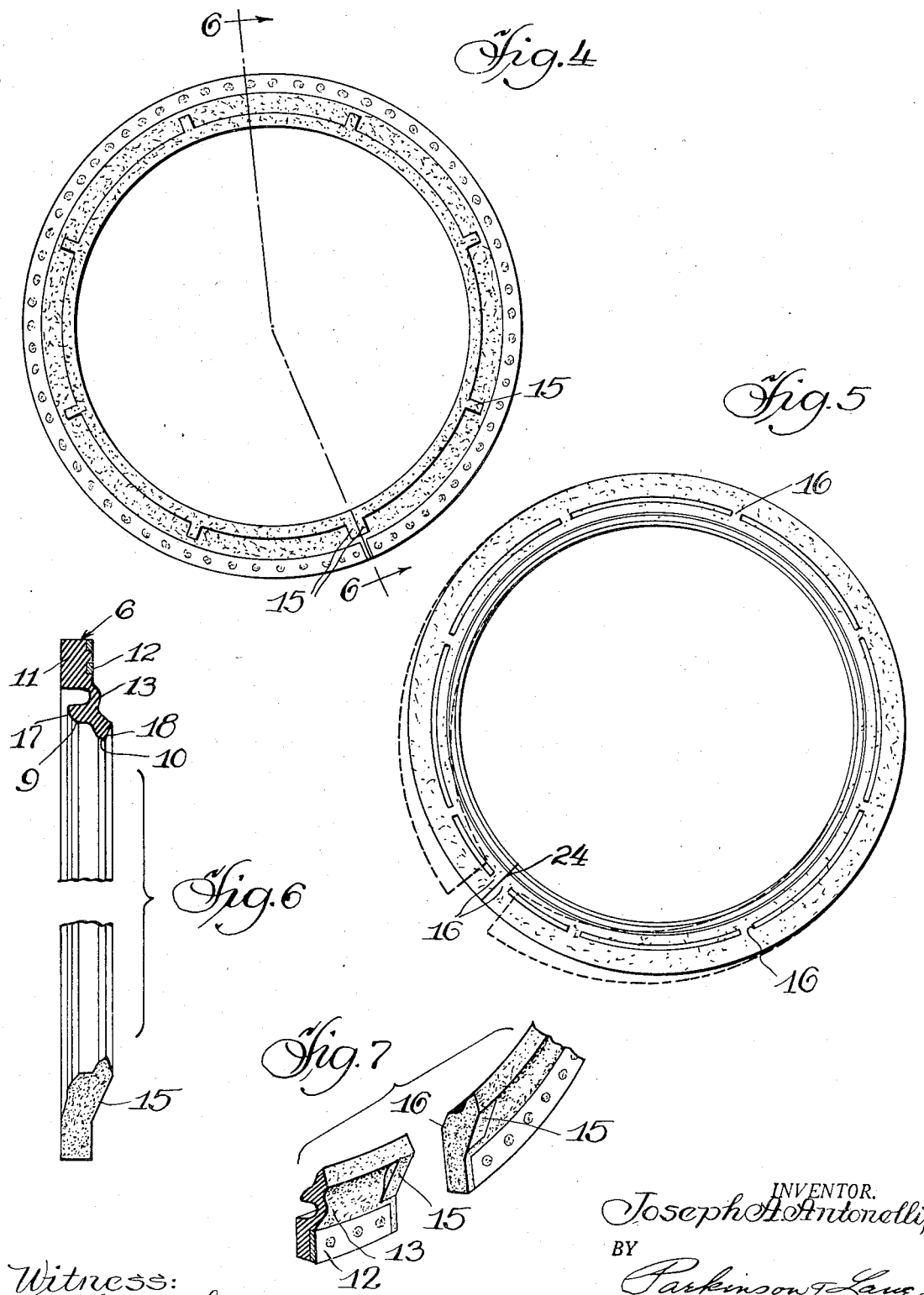

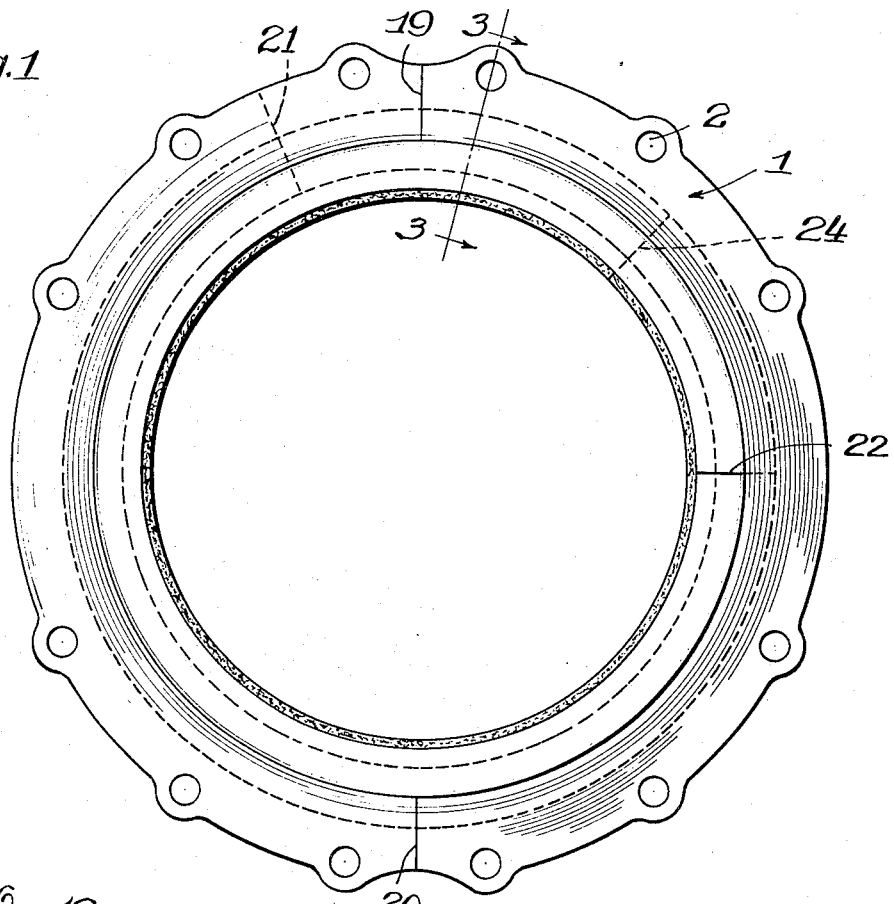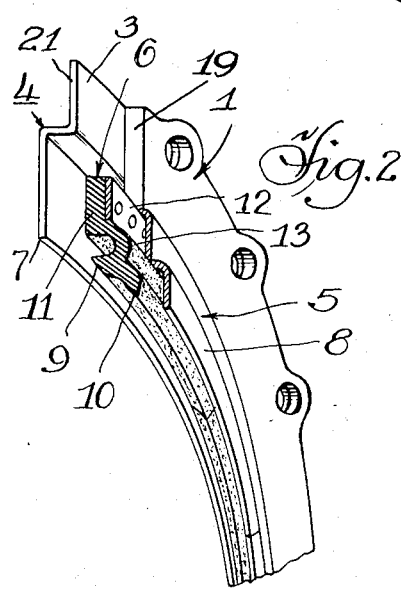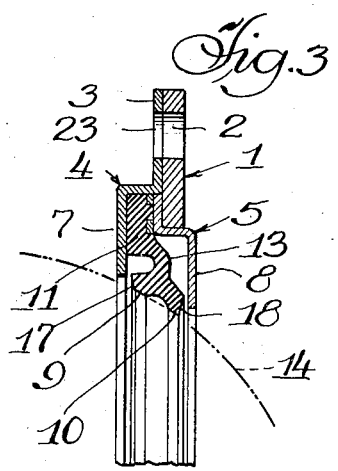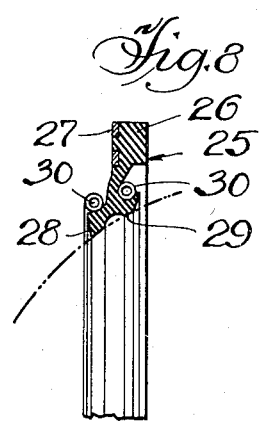

Patented May 9, 1944

2,348,587

UNITED STATES PATENT OFFICE 2,348,587

SEAL CONSTRUCTION

Joseph A. Antonelli, Elgin, Ill., assignor to Victor Manufacturing & Gasket Company, Chicago, Ill., a corporation of Illinois Application October 15, 1942, Serial No. 462,101

4 Claims. (Cl. 288—3)

The present invention relates to a seal construction and more particularly to a seal for sealing the space between a housing upon which the seal is mounted and a ball or spherical member with which the sealing element has a continuous sealing contact.

Among the objects of the present invention is the provision of a novel sealing member adapted to be mounted in a suitable retaining shell for sealing contact with a ball or spherical member. Such a seal is primarily intended for use in front axle assemblies for armored cars and the like, although its use is not limited thereto but may be employed wherever it is intended to seal a spherical surface against the passage of lubricant and other fluids, dust, etc.

The invention further comprehends a novel seal construction in which the component parts are split to facilitate their assembly, and in which the splits or divisions of the parts, when assembled, are so staggered as to insure against any possible leakage of fluid therethrough.

Another object of the present invention is the provision of a novel sealing element formed of an oil resistant, resilient material such as compounded synthetic rubber in which the end walls of the dual wiping lips are so inclined or tapered inwardly as to eliminate the possibility of the material of the sealing lips from being extruded outwardly between the retaining shell and the spherical member against which the lips have sealing contact. The sealing element is also formed with a restricted or reduced neck portion to assure proper flexibility or resiliency and continuous sealing contact of the lip portions with the spherical member to be sealed.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of the present seal when assembled.

Figure 2 is a fragmentary view in perspective of the seal construction.

Figure 3 is a view in vertical cross section taken on the line 3—3 of Figure 1.

Figure 4 is a view in side elevation of the novel sealing element.

Figure 5 is a view similar to Figure 4 but showing the opposite side of the sealing element.

Figure 6 is a fragmentary enlarged view in vertical cross section taken on the line 6—6 of Figure 4.

Figure 7 is a fragmentary view in perspective of the novel sealing diaphragm.

Figure 8 is a view in vertical cross section through an alternate form of sealing member.

Referring more particularly to the embodiment disclosed in the drawings, the novel seal construction, comprises an annular plate 1 of relatively heavy gauge metal provided with a plurality of spaced openings 2 for the reception of bolts or other securing means for anchoring the seal to an encompassing housing. Also anchored in position by this securing means is a radially extending flange 3 of an outer channel member 4 and an inner channel member 5 providing a retaining shell for the sealing member 6. These channel members 4 and 5 are each provided with an inwardly projecting flange 7 and 8, respectively, and beyond the ends of which project the dual lips 9 and 10 of the sealing element 11.

The sealing member 6 comprises the sealing element 11 and a perforated metal washer or ring 12 molded to the body portion of the sealing element. The sealing element is provided with a reduced neck portion 13 merging into the dual lips 9 and 10 spaced a suitable distance apart and each adapted to have a continuous wiping contact with a ball or spherical member 14 shown in dotted outline in Figure 3. The sealing element is preferably formed of a moldable resilient material having oil resistant properties, such as one of the compounded synthetic rubbers. By reducing the neck portion 13 in the manner disclosed, sufficient flexibility and resiliency are secured to maintain the dual lips in continuous contact without the use of any contractile or garter springs. In order to strengthen the sealing element and maintain the inherent resiliency and sealing contact of these lips, reinforcing ribs 15 and 16 are provided at the opposite sides of neck portion 13 and to the rear of the dual lips 9 and 10, as more clearly shown in Figures 4 to 7, inclusive.

In order to prevent the exterior faces 17 and 18 of the dual lips from extruding and being pinched between the inner free edges of the flanges 7 and 8 and the spherical member 14, these faces are inclined or tapered inwardly to an extent to prevent such extrusion under any and all operating conditions.

To facilitate assembly of the seal in the housing encompassing the spherical member, the members forming the assembly are each split or divided as shown more clearly in Figures 1, 4 and 5. The plate 1 is split at 19 and 20 and fitted onto the inner channel member 5 and against the radial flange 3 of the outer channel member 4. These channel members 4 and 5 are split at 21 and 22, respectively, with the flange 3 provided with spaced openings 23 coinciding with the openings 2 of the plate 1 for the insertion of the securing bolts or the like. The sealing member 6, including the sealing element 11 and washer or ring 12, is split at 24. In the assembly of these parts, the splits 19, 20, 21, 22 and 24 are located in staggered relation to thereby prevent leakage between the parts. Where the ends of the sealing element meet as will be seen from Figures 4 and 5, reinforcing ribs 15 and 16 are provided so that when the ends are forced into abutting relation, more material is available at the split to provide a most effective joint and seal thereat.

Figure 8 shows an alternate construction of sealing member 25 in which the body of the sealing element 26 is molded to a ring or washer 27 in a manner similar to the form shown in Figure 3. In this alternate form the rear face of each of the dual lips 28 and 29 is provided with a recess for receiving a contractile or garter spring 30 for continuously forcing or pressing these sealing lips into sealing contact with the spherical member. When assembled, this form of sealing member is mounted into a retaining shell and plate of the type shown in Figures 1, 2 and 3.

Having thus disclosed my invention, I claim:

1. A seal construction comprising a retaining shell comprising a pair of channel members so formed as to clamp a sealing element therebetween, an annular plate adapted to encompass the retaining shell and anchor the shell in a surrounding housing, a resilient sealing element having a part clamped between the channel members and dual lips having a continuous sealing contact with a spherical member and sealing the space between the member and surrounding housing, the channel members, annular plate and sealing element being split to facilitate their assembly and mounting about the spherical member, with the split in each being staggered with respect to the split in the others to prevent leakage thereat.

2. A seal construction comprising a retaining shell comprising a pair of channel members so formed as to clamp a sealing element therebetween, an annular plate adapted to encompass the retaining shell and anchor the shell in a surrounding housing, a resilient sealing element having a radial flange, a reduced neck and dual lips having a continuous sealing contact with a spherical member and sealing the space between the member and surrounding housing, a metal washer molded to the radial flange with the washer and flange anchored between the channel members for retaining the sealing element in operative position, the channel members, annular plate, sealing element and washer being split to facilitate their assembly and mounting about the spherical member, with the split in each being staggered with respect to the split in the others to prevent leakage thereat.

3. In a seal construction, channel members adapted to be clamped together and mounted against a shoulder on an encompassing housing, a sealing element therefor clamped between the channel members and formed of a resilient material comprising a radially extending body portion, a reduced neck portion and dual sealing lips having inwardly tapered end faces and arranged for sealing contact with spaced portions of a spherical surface, the channel members and sealing element being split to facilitate their assembly about the spherical surface and with the splits disposed in staggered relation to prevent leakage thereat.

4. In a seal construction, a retaining shell including split channel members adapted to be clamped together and a sealing member clamped within the shell and between the channel members, the resilient member comprising a molded sealing element of oil resistant, resilient material, having a radially flanged portion and a pair of spaced and arcuately arranged sealing lips, radially arranged reinforcing ribs formed on the sealing element, and a metal ring molded to the radially flanged portion.

JOSEPH A. ANTONELLI.